United States Patent [19]
Johnson

[11] Patent Number: 5,111,549
[45] Date of Patent: May 12, 1992

[54] HANGER WHEEL MOUNT

[75] Inventor: Larry A. Johnson, Elkhart, Ind.

[73] Assignee: L. E. Johnson Products, Inc., Elkhart, Ind.

[21] Appl. No.: 621,245

[22] Filed: Nov. 30, 1990

[51] Int. Cl.$^5$ .................. A47H 15/00; E05D 15/06
[52] U.S. Cl. ................... 16/97; 301/63 PW
[58] Field of Search ............ 16/97, 107; 301/63 PW, 301/5 R, 131, 1

[56] References Cited

U.S. PATENT DOCUMENTS 3,909,066  9/1975  Snowden ............. 301/63 PW

FOREIGN PATENT DOCUMENTS 371564  1/1907  France ................. 301/131
404905  7/1966  Switzerland ............ 16/97

Primary Examiner—Robert L. Spruill
Assistant Examiner—Carmine Cuda
Attorney, Agent, or Firm—James D. Hall

[57] ABSTRACT

A hanger wheel mount wherein the mounting pin includes an annular land for contacting only a portion of the wheels interior surface. The use of the annular land reduces the pull required to move a door suspended by a hanger bracket. The roller or wheel includes an inturned lip which contacts a portion of the pin adjacent the bracket to reduce wheel wobble.

5 Claims, 1 Drawing Sheet

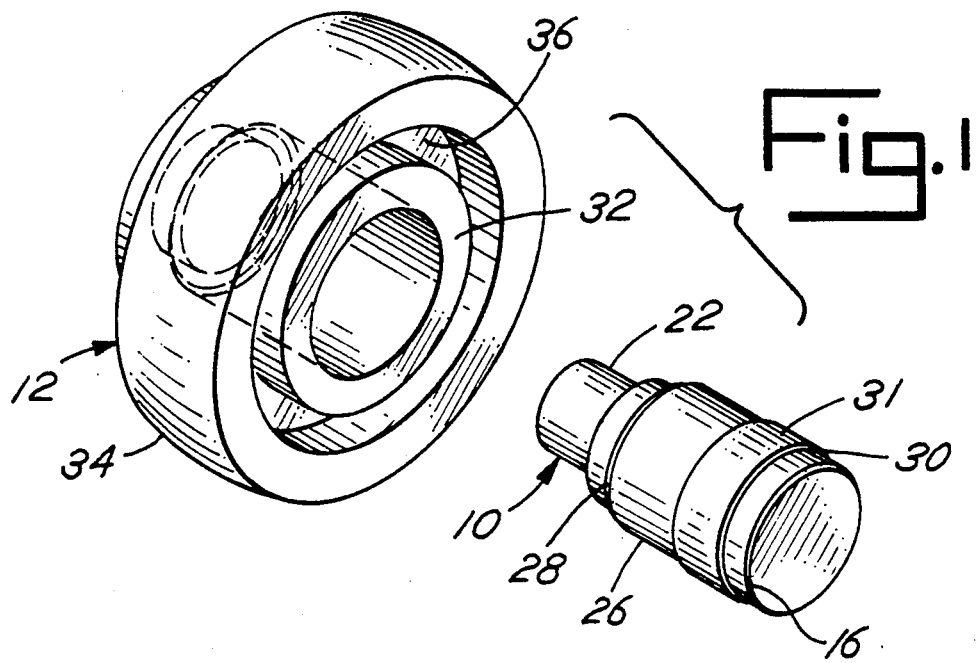
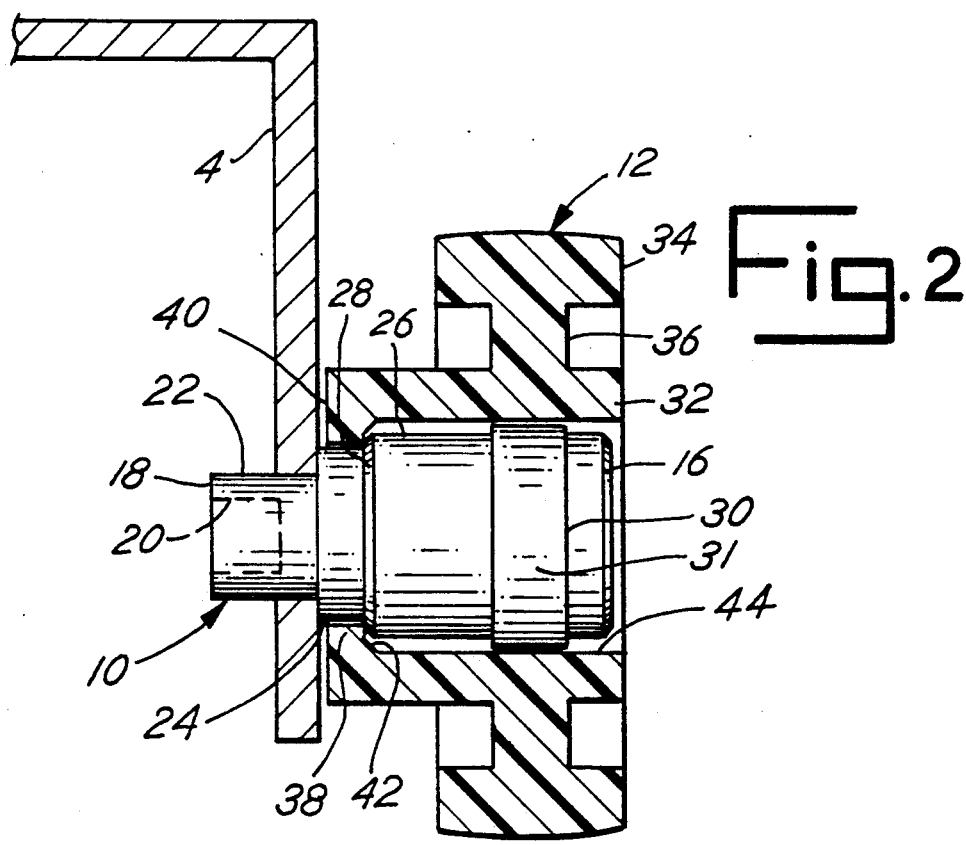

5,111,549

HANGER WHEEL MOUNT

FIELD OF THE INVENTION

This invention relates to a hanger wheel mount for a sliding door.

SUMMARY OF THE INVENTION

Sliding doors commonly used as closet doors are typically suspended from brackets having wheels connected thereto. The brackets are often referred to as hangers. The wheels are rotatably mounted to the hangers by cylindrical pins staked to the bracket. The wheels are accommodated within tracks connected above the door opening.

Heretofore, the pins used to mount the wheels include a smooth outer side wall which contacts a substantial portion of the inner surface of the wheel. The contact between the outer surface of the stationary pin and the inner surface of the wheel creates frictional drag.

The hanger wheel mounting pin of this invention greatly reduces the frictional drag created by contact between the wheel hub and pin by providing a raised land on the pin to reduce the amount of surface contact between the wheel hub and pin. The land forms a bearing surface for contact with the hub's inner surface. The reduction of surface contact between the stationary mount and wheel hub significantly reduces the amount of frictional drag experienced by the wheel. The invention also includes a bevelled collar which engages with a bevelled lip on the nylon wheel to restrict the amount of wobble in the wheel.

Accordingly, it is an object of this invention to provide a novel hanger wheel mount.

Another object of this invention is to provide a hanger wheel mount with reduced pin to wheel contact.

Another object of this invention is to provide a wheel hanger mount with reduced frictional drag.

Other objects of this invention will become apparent upon a reading of the following description taken with the accompanying drawings.

BRIEF DESCRIPTION OF THE PREFERRED EMBODIMENT

FIG. 1 is an exploded perspective view of the invention.

FIG. 2 is a fragmented view with the wheel and hanger sectioned.

DESCRIPTION OF THE PREFERRED EMBODIMENT

The preferred embodiment herein described is not intended to be exhaustive or to limit the application to the precise form disclosed. Rather, it is chosen to best explain the invention so that others skilled in the art might utilize its teachings.

Referring now to the drawings, a hanger pin 10 and nylon wheel 12 is illustrated. Pin 10 is generally cylindrical and includes a distal end 16 and a proximal end 18. A longitudinally aligned blind bore 20 is formed in proximal end 18. Pin 10 is formed having a cylindrical body 26. A longitudinal protrusion 22 extends from one end of body 26. A collar 24 is formed between protrusion 22 and body 26. A bevelled edge 28 is formed between collar 24 and body 26. An annular land 30 is formed on body 26. Land 30 includes an outer bearing surface 31.

Wheel 12 includes a cylindrical hub 32 and outer wheel 34 interconnected by an integral web 36. An inturned lip 38 extends from end 40 of hub 32. An inner bevelled surface 42 is formed between hub 32 and lip 38 as illustrated. Hub 32 includes a smooth walled inner surface 44.

In use, pin 10 is inserted into hub 32 as illustrated such that protrusion 18 of the pin extends outwardly from end 40 of the hub as illustrated. So positioned lip 38 is axially aligned with step 24 of the pin and is close proximity thereto. The inner surface 44 of hub 32 is in close proximity to the bearing surface 31 of land 30. The clearance between the pin and hub reduces rolling friction and provides an area for grease residue to accumulate. Protrusion 18 of pin 10 is inserted through an opening in the hanger bracket 4 until shoulder 19 contacts the bracket. Protrusion 18 is then staked to the bracket to secure pin 10 to the bracket. Lip 38 contacts bevelled edge 28 to prevent wheel 12 from shifting laterally relative to pin 10. In practice, at least two and typically three wheels are mounted to the bracket 4 by pins 10. The bracket is commonly connected to a sliding door such that the door is suspended from the bracket. The wheels are accommodated within a track to permit sliding of the door. It should be understood that the specific arrangement of the bracket in association with a sliding door is known and does not constitute a novel portion of this invention. As the wheel rolls along a track, the inner surface 44 of hub 32 rides on bearing surface 31 of land 30. The use of land 30 as a bearing surface for the wheel limits the amount of surface to surface contact between the wheel and pin and thereby limiting the amount of pull required to move a door connected by a bracket using the pin and wheel of this invention. Lip 38 contacts pin 10 at step 24 to limit excessive wobbling of wheel 12 relative to pin 10 caused in part by the reduction of surface contact between the pin and wheel. Bevelled edge 28 of the pin and bevelled surface 42 contact during rotation of the wheel relative to the pin to prevent the pin from biting into the wheel during rotation.

It should be understood that the application is not to be limited to the precise form disclosed but may be modified within the scope of the appended claims.

I claim:

1. In combination a mounting pin and a wheel for connection of said wheel to a door hanger bracket, said wheel including a hub having a smooth continuous inner surface and an inwardly extending annular lip, said pin including a cylindrical body and a protrusion extending longitudinally from one end of said body for connecting said pin to said hanger bracket, said lip contacting said pin adjacent said protrusion to prevent said wheel from laterally shifting relative to said pin, said pin including an annular land formed about said body, said land spaced longitudinally from said lip and pin contact and also contacting a portion of said inner surface of said hub and constituting a bearing surface for said wheel said hub extending with radial clearance at all times about said body between said land and said lip and between said land and the opposite end of the body irrespective of the operational forces applied to said wheel.

2. The combination of claim 1 wherein said pin further includes a collar formed between said protrusion and said body, a first shoulder being formed at the junction of said protrusion and said collar, a second shoulder being formed at the junction of said collar and said body, said lip being positioned between said hanger and said second shoulder, said first shoulder for abutting said hanger with said protrusion extending through said hanger, said second shoulder being bevelled toward said collar, said wheel including a bevelled annular inner wall between said lip and said inner surface of said hub, wherein bevelled shoulder and bevelled wall contact during rotation of the wheel relative to said pin.

3. The combination of claim 1 wherein said wheel includes an outer wheel, a web connecting said hub to said outer wheel, said annular land formed on said pin in alignment with said web.

4. The invention in claim 1 wherein said pin includes a singular annular land.

5. A mounting pin connected to a wheel to a door hanger bracket, said wheel including a hub having a smooth continuous inner surface and an inwardly extending annular lip, said pin including a cylindrical body and a protrusion extending longitudinally from one end of said body for connecting said pin to said hanger bracket, said lip contacting said pin adjacent said protrusion to support said wheel upon said pin and to prevent said wheel from laterally shifting relative to said pin, said pin including an annular land formed about said body said land contacting a portion of said inner surface of said hub longitudinally spaced from said lip and pin contact and constituting the load bearing surface for said wheel said hub extending with radial clearance at all times about said body between said land and said lip and between said land and the opposite end of the body irrespective of the operational forces applied to said wheel.

* * * * *